United States Patent
Kanno et al.

(10) Patent No.: US 11,618,702 B1
(45) Date of Patent: Apr. 4, 2023

(54) VITAL WATER

(71) Applicants: Kyosuke Kanno, Tokyo (JP); Gwang Ho Lee, Brooklyn, NY (US)

(72) Inventors: Kyosuke Kanno, Tokyo (JP); Gwang Ho Lee, Brooklyn, NY (US)

( * ) Notice: Subject to any disclaimer, the term of this patent is extended or adjusted under 35 U.S.C. 154(b) by 0 days.

(21) Appl. No.: 16/914,196

(22) Filed: Jun. 26, 2020

(51) Int. Cl.
| | | |
|---|---|---|
| C02F 9/00 | (2023.01) | |
| B01D 61/02 | (2006.01) | |
| B01D 61/58 | (2006.01) | |
| B01D 19/00 | (2006.01) | |
| C02F 1/20 | (2023.01) | |
| C02F 1/44 | (2023.01) | |
| C02F 1/34 | (2023.01) | |
| C02F 103/04 | (2006.01) | |
| B01D 61/08 | (2006.01) | |
| B01D 69/08 | (2006.01) | |
| C02F 1/00 | (2023.01) | |

(52) U.S. Cl.
CPC ............ *C02F 9/00* (2013.01); *B01D 19/0031* (2013.01); *B01D 61/025* (2013.01); *B01D 61/08* (2013.01); *B01D 61/58* (2013.01); *B01D 69/08* (2013.01); *C02F 1/008* (2013.01); *B01D 2311/2653* (2013.01); *B01D 2313/18* (2013.01); *B01D 2313/32* (2013.01); *C02F 1/20* (2013.01); *C02F 1/34* (2013.01); *C02F 1/441* (2013.01); *C02F 2103/04* (2013.01); *C02F 2201/005* (2013.01); *C02F 2209/40* (2013.01)

(58) Field of Classification Search
CPC ........ B01D 69/08; B01D 61/08; B01D 61/58; B01D 2311/2653; B01D 2313/18; B01D 2313/32; B01D 19/0031; B01D 61/025; C02F 1/008; C02F 1/20; C02F 1/34; C02F 2103/04; C02F 2201/005; C02F 2209/40; C02F 9/00; C02F 1/441
See application file for complete search history.

(56) References Cited

U.S. PATENT DOCUMENTS

| | | | | |
|---|---|---|---|---|
| 7,651,614 B2 * | 1/2010 | Kelsey | ...................... | C02F 1/34 |
| | | | | 210/607 |
| 2007/0221581 A1 * | 9/2007 | Kitami | ...................... | C02F 9/00 |
| | | | | 210/198.1 |

* cited by examiner

*Primary Examiner* — Terry K Cecil

(57) ABSTRACT

By completely removing the gas dissolved in the water, the ultra-high-pressure collision between the water flows is realized. This ultra-high pressure collision not only breaks the hydrogen bond between water molecules, but also breaks the structure of water molecules, making water ($H_2O$) instantly become $H^+$, $OH^-$, $O^-$ ionic state, or even become independent hydrogen atom (H) and oxygen atom (O) states, and then return to the normal water molecule ($H_2O$) state in an instant. By maintaining high pressurized state (maturity), stabilize the link between above-mentioned original water molecules ($H_2O$). Through above-mentioned process of instantaneous breaking and instantaneous recovery, every water molecule is caused to become full of activity.

4 Claims, 1 Drawing Sheet

FIG 1. Vital Water Production Process
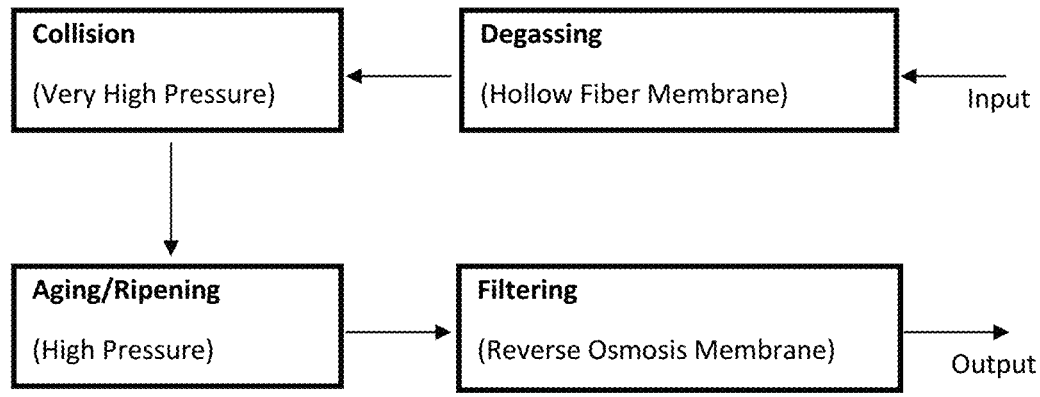
FIG 2. Production Equipment
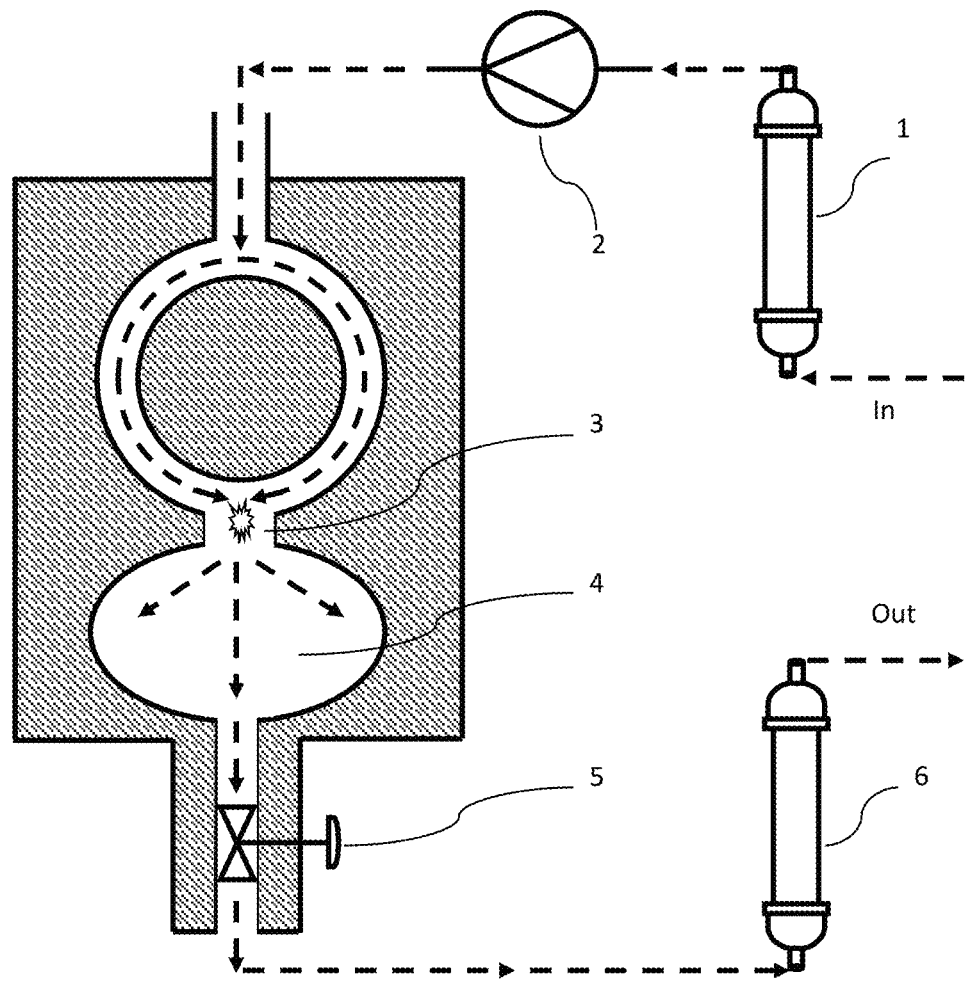

VITAL WATER

CROSS-REFERENCE TO RELATED APPLICATIONS

Not Applicable

BACKGROUND OF THE INVENTION

The scope of this invention is in the field of water purification. Water constitutes 70% of human body, and there are many types of water available for consumption, such as filtered water, mineral water, ionized water, and spring water. One of the reasons why spring water has high purity is that it undergoes highly pressurized environment. This high-pressure treatment coupled with filtering of gas and extraneous particles, separate $H_2O$ molecule chains into individual $H_2O$ molecules. The result is high quality pure water with superior absorption.

BRIEF SUMMARY OF THE INVENTION

In current process of water purification, electrical or wave energy is directly applied onto water to separate particles. Vital water production procedure takes the process of water purification one step further by incorporating degasification and ultra-high-pressure collision to instantaneously breakdown and reform water molecules. The result is restored water molecules full of vitality and life.

BRIEF DESCRIPTION OF DRAWINGS

FIG. 1 is a drawing showing vital water production process,

FIG. 2 is a drawing showing vital water production equipment with description of referred parts.

PRODUCTION EQUIPMENT PARTS

1—Degassing equipment. Hollow Fiber Membrane is used.
2—High pressure water pump. Water Jet technology is used.
3—Collision chamber.
4—Buffer chamber. Connected to the collision chamber.
5—Control valve that hinders the flow of water and regulates the speed of water flow.
6—Filter. Reverse osmosis membrane is used.

DETAILED DESCRIPTION OF THE INVENTION

This invention utilizes the process of instantaneous breaking and recovery to produce water molecule full of vitality. Complete removal of the gas dissolved in water produces ultra-high-pressure collision between the water flows. This ultra-high-pressure collision breaks the hydrogen bond between water molecules and the water molecule structure, making water ($H_2O$) instantly become $H^+$, $OH^-$, $O^-$ ionic state or independent hydrogen atom (H) and oxygen atom (O) states, to be restored to the normal water molecule ($H_2O$) state in an instant. By maintaining high pressurized state (maturity), the link between above-mentioned original water molecules ($H_2O$) is stabilized.

Production method of vital (vita particle) water is comprised of degassing, ultra-high-collision, high-pressure retention and filtration. Degassing is processed using hollow fiber membranes 1. The ultra-high-pressure collision is realized by oblique collisions of two or more water streams. The pressure of each water flow is above 200 MPa. The high-pressure retention process is realized by controlling the water discharge speed after ultra-high-pressure collision. The maintaining high-pressure is from 1 MPa to 100 MPa. The filtering process uses a reverse osmosis membrane 6.

A hollow fiber membrane 1 is used to remove oxygen, nitrogen and other gases dissolved in water. Its purpose is to alleviate the strong cavitation produced by gas dissolved in water during ultra-high pressure and ultra-high-speed collision. Severe cavitation will cause partial explosion of water and damage the collision chamber and other equipment.

The water discharged in the process 1 (degassing) is divided into two water streams after pressurization and collide at an angle. The pressure of each stream is above 200 MPa and the speed is above Mach 2 (twice the speed of sound). The pressurization process uses the mature water jet technology 2. Each stream of water causes an impact of over 200 MPa, so if there is no complete degassing in process 1, the result could not be achieved due to the water explosion. The collision takes place in a chamber 3 filled with water. If the collision chamber 3 is not filled with water and some gas still exists, the strong cavitation caused by gas during the collision of the water flow will bring about a partial explosion of water, which not only defeats the purpose of vital water production, but also destroys the collision chamber and other equipment.

After process 2 (ultra-high pressure collision), water is not allowed to be easily discharged, that is to say, water is not allowed to drop pressure easily, but it needs to retain pressurization for a while before being discharged. By adjusting the valve 5, the water discharge becomes obstructed, and the water discharge rate is now controlled, and the water remains in a high-pressure state for a certain time period before being discharged. This process takes place in the buffer chamber 4, which is linked to the collision chamber 3 and has the function of storing buffers. The high pressure of the buffer chamber 4 is from 1 MPa to 100 MPa. After process 3 (High-pressure retention), a reverse osmosis membrane filter 6 is used to remove mineral and other wastes generated during the process of ultra-high-pressure collision and high-pressure retention.

We claim:

1. A method for producing vital (vita particle) water comprising the following steps:
    (a) degassing a flow of water in a membrane-based degassing apparatus;
    (b) dividing the degassed water flow into two or more streams and directing the streams to collide at an oblique angle within a collision chamber, each stream being at a pressure above 200 MPa and at a speed above Mach 2;
    (c) retaining water from the collision chamber within a buffer chamber linked to the collision chamber and at a pressure from 1 MPa to 100 MPa; and
    (d) filtering the water from the buffer chamber.

2. The method of claim 1, wherein the membrane-based degassing apparatus of the degassing step comprises hollow fiber membranes.

3. The method of claim 1, wherein water is retained in the buffer chamber by adjusting a valve positioned within a discharge line from the buffer chamber.

4. The method of claim 1, wherein the filtering step comprises filtering through a reverse osmosis membrane.

* * * * *